June 16, 1925.
I. WARNER
LIME BURNING PROCESS
Filed Sept. 15, 1923
1,542,195
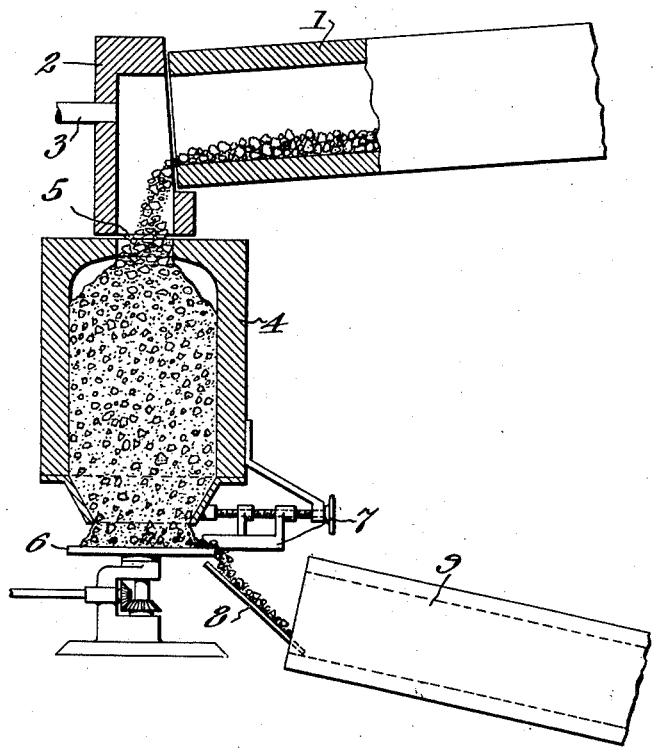
Inventor:
Irving Warner,
By Byrnes, Townsend & Brickenstein,
Attorneys.

Patented June 16, 1925.

1,542,195

UNITED STATES PATENT OFFICE.

IRVING WARNER, OF BELLEFONTE, PENNSYLVANIA.

LIME-BURNING PROCESS.

Application filed September 15, 1923. Serial No. 662,954.

*To all whom it may concern:*

Be it known that I, IRVING WARNER, a citizen of the United States, residing at Bellefonte, in the county of Center and State of Pennsylvania, have invented certain new and useful Improvements in Lime-Burning Processes, of which the following is a specification.

This invention relates to a lime burning process particularly adapted to be employed in connection with a rotary kiln and to apparatus for carrying out the process.

As is well known in the art, the use of a rotary kiln in the burning of lime is open to the objection that it is difficult, if not impossible, to secure a complete burning of the lime. Due to the inherent tendency of the smaller stone in the rolling mass to gather at the center, the larger stones prevent the heat from contacting with the small stones. By grading the limestone so that the largest stone shall not be more than 2 or 2½ times the size of the smallest stone improved results are obtained, but this method of operation results in a loss of valuable raw material. By limiting the thickness of the layer of stone in the kiln, more complete calcination is obtained, but this method results in a loss in capacity and efficiency of the kiln. While these methods or a combination of the methods may partially overcome the difficulty of imperfect calcination they are open to the serious objection that they add materially to the cost of production.

An object of the invention is to provide an economic process for obtaining completely calcined lime, and more specifically to provide a process in which a rotary kiln may be employed in the normal manner for performing one step of the process. The invention also contemplates the provision of appropriate apparatus in which the process may be performed.

According to current practice, the incompletely burned lime is cooled as rapidly as possible after its discharge from the rotary kiln, but in carrying out my process the hot mixture of burned and unburned lime is stored for an appreciable time in a heat-insulated receptacle. In the storage or seasoning receptacle the unburned lime is raised to or above the decomposition temperature as the entire mass assumes a uniform temperature. The transfer of heat readily takes place since the pieces containing unburned lime or "core," i. e. showing the presence of $CO_2$, are quite small and are evenly distributed throughout the mass.

The average temperature of the lime discharged from a rotary kiln is usually about 500° to 800° F. above the temperature of dissociation and it is evident from a mathematical standpoint that this excess heat, when properly conserved, is sufficient to complete the calcination of such quantities of unburned lime as may be produced in a heavily loaded kiln. The latent heat of dissociation of $CaCO_3$, per pound of $CO_2$ evolved, is 1754 B. t. u. and the specific heat of lime is .217, hence the excess temperature over the temperature of dissociation necessary to drive off one per cent of $CO_2$ is $$\frac{\text{Latent heat of decomposition of } CO_2}{\text{Specific heat of lime} \times 100} = \frac{1754}{.217 \times 100} = 81° \text{ F.}$$

Or, assuming that the mean temperature of the discharged lime is 2248° F., which is a normal condition, the excess temperature of 600° above the temperature of dissociation, 1648° F., renders $$600 \times .217 \times 100 = 13{,}020 \text{ B. t. u.}$$

available from each 100 pounds of lime, and this heat, when transferred to the unburned lime, will evolve $$\frac{13020}{1754} = 7.4 \text{ lbs. of } CO_2.$$

Even in a heavily loaded kiln and with a considerable range of size it is comparatively easy to burn down to a $CO_2$ content of 4% to 8% but it is very difficult to make a more completely calcined product. From the figures given above it will be seen that the sensible heat of the lime will be sufficient to complete the calcination when the mean temperature of the lime, as discharged from the kiln, is from 325° to 650° F. above the dissociation temperature.

In the accompanying drawing, the figure is a vertical section illustrating one form of apparatus which may be used in carrying out my novel process.

In the figure, the numeral 1 identifies the discharge end of a rotary kiln which is provided with a kiln hood 2 in which the fuel nozzle 3 is located. These parts of the apparatus may be of any standard design and any of the usual fuels may be employed. The heat insulated receptacle 4 is arranged below the kiln hood and the inlet 5 of the receptacle is made as small as practical to prevent loss of heat by radiation from the lime within the receptacle. The top and walls of the receptacle 4 are jacketed with or formed of any suitable material of low thermal conductivity to provide for the thorough insulation against heat losses. A suitable feeding out device, such as rotating table 6 and an adjustable knife scraper 7 may be employed for discharging the completely calcined lime from the seasoning receptacle. The hot lime removed by the scraper 7 falls upon a chute 8 which conveys it to a cooler, such as a revolving cooler 9. Although the inlet opening of the receptacle is designed to prevent loss of heat by radiation and convection it is not essential that the outlet opening be air tight, in fact the ingress of a small quantity of air such as would normally takes place with any feeding device of common use will be helpful in removing the $CO_2$ evolved during the seasoning process.

The capacity of the receptacle is preferably such that it will hold about 4 hours' output of the kiln but seasoning for much shorter periods may be sufficient to complete the calcination and a seasoning of even one hour or a half-hour will greatly improve the product. The discharge mechanism is so regulated that the receptacle may be kept as full as possible at all times.

It is to be noted that the process does not contemplate a cooling of the mass within the receptacle but is based upon a transfer of heat between unequally heated particles in a highly heated mass. So far as is possible, the heat of the lime as it leaves the kiln is conserved and the seasoned lime is fed from the receptacle at substantially the same rate as the kiln-burned lime enters the top, with the object of maintaining the greatest mass possible within the seasoning receptacle and keeping the material contained therein at substantially the same level. This will permit a seasoning receptacle of any given size to operate at its maximum efficiency and when the lime is removed from the bottom it may be cooled by any of the processes now employed for cooling the burnt lime as discharged directly from the kiln.

It will be understood that the invention is not limited to the specific apparatus which is shown in the drawings, since various forms of heat insulated receptacles and associated chutes or conveyors may be employed in carrying out the process.

While I have in the claims referred to a rotary kiln, my invention includes other like calcining means in which the limestone is subjected to calcining conditions like those in a rotary kiln.

I claim:

The process of making lime from limestone which consists in heating the same in passage through a rotary kiln to a temperature above that of dissociation and then transferring the heated mass, while still above the dissociation temperature. to a heat insulated receptacle and permitting the mass to remain in this receptacle for a sufficient time to complete the calcination.

In testimony whereof I affix my signature.

IRVING WARNER.